(12) United States Patent
Kwon et al.

(10) Patent No.: US 10,564,480 B2
(45) Date of Patent: Feb. 18, 2020

(54) LIQUID CRYSTAL DISPLAY AND MANUFACTURING METHOD THEREOF

(71) Applicant: SAMSUNG DISPLAY CO., LTD., Yongin-si, Gyeonggi-do (KR)

(72) Inventors: Oh Jeong Kwon, Hwaseong-si (KR); Hyeok Jin Lee, Seongnam-si (KR); Ka Eun Kim, Yongin-si (KR); Soo Dong Kim, Seoul (KR); Su Jin Kim, Seoul (KR); Jae Bum Cho, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 280 days.

(21) Appl. No.: 15/353,757

(22) Filed: Nov. 17, 2016

(65) Prior Publication Data

US 2017/0343862 A1 Nov. 30, 2017

(30) Foreign Application Priority Data

May 30, 2016 (KR) ........................ 10-2016-0066147

(51) Int. Cl.
| | |
|---|---|
| *G02F 1/1337* | (2006.01) |
| *G02F 1/1368* | (2006.01) |
| *G02F 1/1343* | (2006.01) |
| *C09K 19/56* | (2006.01) |
| *C09K 19/04* | (2006.01) |

(52) U.S. Cl.
CPC ........ *G02F 1/133788* (2013.01); *C09K 19/56* (2013.01); *G02F 1/1368* (2013.01);
(Continued)

(58) Field of Classification Search
CPC ......... G02F 1/133753; G02F 1/133711; G02F 1/133788; G02F 2001/133726;
(Continued)

(56) References Cited

U.S. PATENT DOCUMENTS

| | | | |
|---|---|---|---|
| 8,619,222 B2 | 12/2013 | Nakamura et al. | |
| 8,830,428 B2 | 9/2014 | Miyakawa et al. | |

(Continued)

FOREIGN PATENT DOCUMENTS

| | | |
|---|---|---|
| EP | 2 824 161 A1 | 1/2015 |
| KR | 10-2014-0073483 A | 6/2014 |

(Continued)

*Primary Examiner* — Sophie Hon
(74) *Attorney, Agent, or Firm* — Kile Park Reed & Houtteman PLLC

(57) ABSTRACT

A liquid crystal display including a first substrate; a second substrate on the first substrate; a liquid crystal layer between the first substrate and the second substrate; a first alignment layer between the first substrate and the liquid crystal layer and including a first polymer; a second alignment layer between the second substrate and the liquid crystal layer and including a second polymer; and protrusions between the first alignment layer and the liquid crystal layer, wherein at least one of the protrusions includes an alignment polymer polymerized with a reactive mesogen, the first polymer includes a first main chain and a plurality of first side chains connected to the first main chain, and at least one of the plurality of first side chains includes a photoreactive group and a photoreactive derivative, and wherein the photoreactive group has an absorbance that is greater than that of the reactive mesogen.

20 Claims, 5 Drawing Sheets

(52) U.S. Cl.
CPC .. *G02F 1/133707* (2013.01); *G02F 1/133711* (2013.01); *G02F 1/133753* (2013.01); *G02F 1/134309* (2013.01); *C09K 2019/0448* (2013.01); *G02F 2001/133726* (2013.01); *G02F 2001/133742* (2013.01); *Y10T 428/1005* (2015.01)

(58) Field of Classification Search
CPC ... G02F 2001/133742; G02F 1/133703; G02F 1/133707; Y10T 428/1005–1032
See application file for complete search history.

(56) References Cited

U.S. PATENT DOCUMENTS

| | | | | |
|---|---|---|---|---|
| 2008/0013292 | A1* | 1/2008 | Slikkerveer | G06F 1/1601 361/749 |
| 2010/0149446 | A1* | 6/2010 | Fujisawa | C09K 19/3852 349/38 |
| 2012/0092603 | A1* | 4/2012 | Mizusaki | C08F 20/20 349/129 |
| 2012/0218500 | A1* | 8/2012 | Nakamura | G02F 1/133711 349/128 |
| 2014/0375939 | A1* | 12/2014 | Zhong | C09D 179/08 349/123 |
| 2016/0017226 | A1* | 1/2016 | Fujisawa | G02F 1/134363 349/33 |

FOREIGN PATENT DOCUMENTS

| | | |
|---|---|---|
| KR | 10-2014-0132206 A | 11/2014 |
| KR | 10-2015-0012093 A | 2/2015 |
| KR | 10-2015-0130801 A | 11/2015 |
| WO | WO-2013183684 A1 * | 12/2013 |

* cited by examiner

LIQUID CRYSTAL DISPLAY AND MANUFACTURING METHOD THEREOF

CROSS-REFERENCE TO RELATED APPLICATION

Korean Patent Application No. 10-2016-0066147, filed on May 30, 2016, in the Korean Intellectual Property Office, and entitled: "Liquid Crystal Display and Manufacturing Method Thereof," is incorporated by reference herein in its entirety.

BACKGROUND

1. Field

Embodiments relate to a liquid crystal display and a method of manufacturing the same.

2. Description of the Related Art

A liquid crystal display (LCD) may include two sheets of display panels including a pixel electrode and a field generating electrode such as a common electrode, and a liquid crystal layer between the two display panels.

The liquid crystal display generates an electric field in the liquid crystal layer by applying a voltage to the field generating electrodes, determines a direction of liquid crystal molecules of the liquid crystal layer with the electric field, and controls polarization of incident light to thereby display an image.

The above information disclosed in this Background section is only for enhancement of understanding of the background and therefore it may contain information that does not form the prior art that is already known in this country to a person of ordinary skill in the art.

SUMMARY

Embodiments are directed to a liquid crystal display and a method of manufacturing the same.

The embodiments may be realized by providing a liquid crystal display including a first substrate; a second substrate overlapping the first substrate at a distance therefrom; a liquid crystal layer between the first substrate and the second substrate, the liquid crystal layer including a plurality of liquid crystal molecules; a first alignment layer between the first substrate and the liquid crystal layer, the first alignment layer including a first polymer; a second alignment layer between the second substrate and the liquid crystal layer, the second alignment layer including a second polymer; and a plurality of protrusions between the first alignment layer and the liquid crystal layer, wherein at least one of the plurality of protrusions includes an alignment polymer polymerized from a reactive mesogen, wherein the first polymer includes a first main chain and a plurality of first side chains connected to the first main chain, at least one of the plurality of first side chains including a photoreactive group or a photoreactive derivative group, and wherein the photoreactive group has an absorbance that is greater than that of the reactive mesogen within a light wavelength range for forming the alignment polymer.

The photoreactive group may include a group represented by one of the following Chemical Formula 1 to Chemical Formula 12:

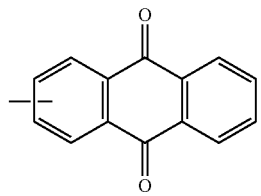

Chemical Formula 1

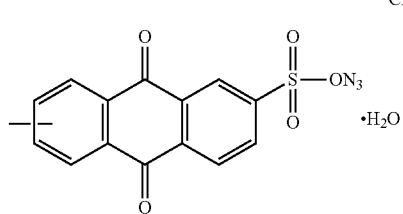

Chemical Formula 2

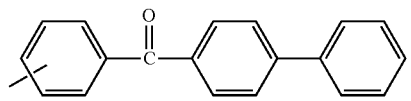

Chemical Formula 3

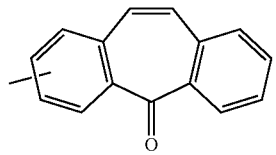

Chemical Formula 4

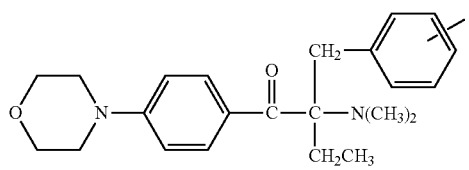

Chemical Formula 5

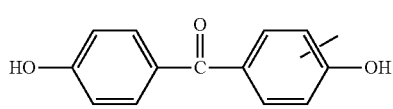

Chemical Formula 6

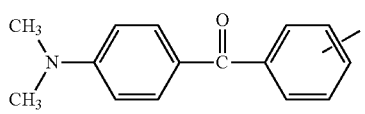

Chemical Formula 7

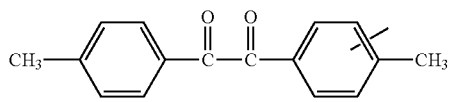

Chemical Formula 8

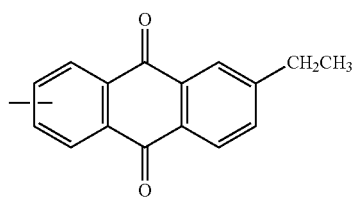

Chemical Formula 9

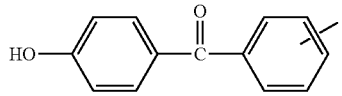

Chemical Formula 10

-continued

Chemical Formula 11

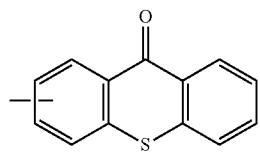

Chemical Formula 12

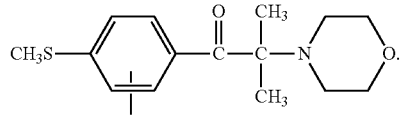

The reactive mesogen may include a compound represented by the following Chemical Formula 13:

R1-S1-P1-E-P2-S2-R2  Chemical Formula 13 wherein, in Chemical Formula 13, R1 and R2 may each independently include an acrylate or a methacrylate, S1 and S2 may each independently include a substituted or non-substituted C1 to C4 alkylene group or a single bond, P1 and P2 may each independently include a substituted or non-substituted

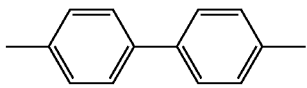

or a substituted or non-substituted

, and E may include —O—, —S—, —CO—, —CO—O—, —OCO—, —O—CO—O—, —OCH$_2$—, —CH$_2$O—, —COO—, —O—CH$_2$—CH$_2$—O—, or a single bond.

The reactive mesogen may include a compound represented as given in Chemical Formula 14 to Chemical Formula 21:

Chemical Formula 14

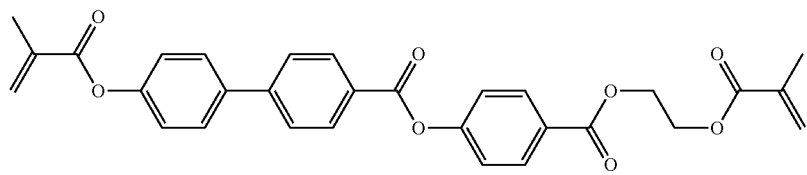

Chemical Formula 15

Chemical Formula 16

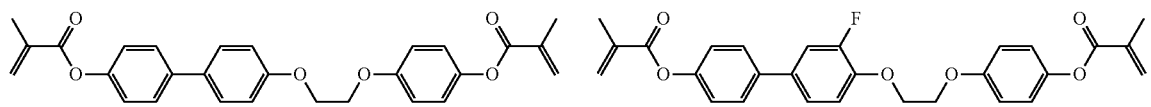

Chemical Formula 17

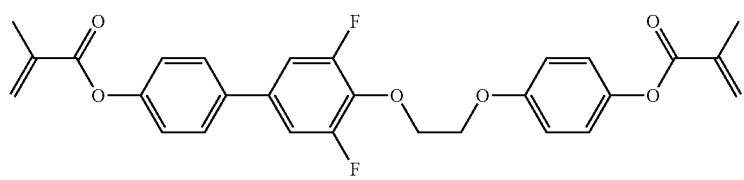

Chemical Formula 18

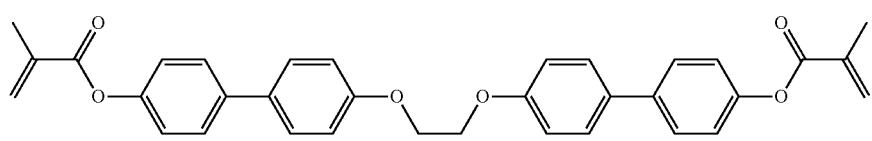

Chemical Formula 19

Chemical Formula 20

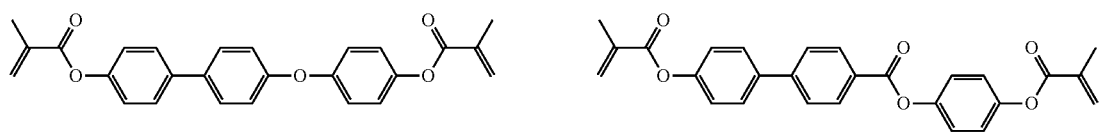

Chemical Formula 21

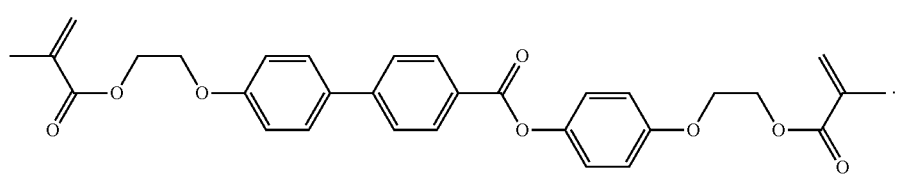

The light wavelength range may be about 250 nm to about 450 nm.

A pre-tilt angle of a liquid crystal molecule that is adjacent to the first alignment layer may be greater than that of a liquid crystal molecule that is adjacent to the second alignment layer.

The liquid crystal display may be a curved display.

The second polymer may include a second main chain and a plurality of second side chains connected to the second main chain, and at least one of the plurality of second side chains may include a vertical alignment group.

At least one of the plurality of first side chains may further include a vertical alignment group.

The liquid crystal display may further include a thin film transistor between the first substrate and the first alignment layer; a pixel electrode connected with the thin film transistor; and a common electrode forming an electric field with the pixel electrode.

The embodiments may be realized by providing a method of manufacturing a liquid crystal display, the method including preparing a lower panel including a first alignment layer on a first substrate; preparing an upper panel including a second alignment layer on a second substrate; forming a liquid crystal layer between the lower panel and the upper panel such that the liquid crystal layer includes a plurality of liquid crystal molecules; and irradiating light to the lower panel, the upper panel, and the liquid crystal layer, which are bonded to each other, wherein irradiating the light includes irradiating light to a photoreactive group of a first polymer and a reactive mesogen of the first alignment layer to form protrusions including an alignment polymer polymerized from the reactive mesogen, and wherein the photoreactive group has a higher absorbance than the reactive mesogen within a wavelength range of the irradiated light.

The first polymer may include a first main chain, and a plurality of first side chains connected to the first main chain, at least one of the plurality of first side chains including the photoreactive group or a photoreactive derivative group, and the second alignment layer may include a second polymer, the second polymer including a second main chain and a plurality of second side chains connected to the second main chain, at least one of the plurality of second side chains including a vertical alignment group.

The photoreactive group may include a group represented by one of the following Chemical Formula 1 to Chemical Formula 12:

Chemical Formula 1

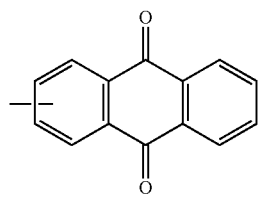

Chemcal Formula 2

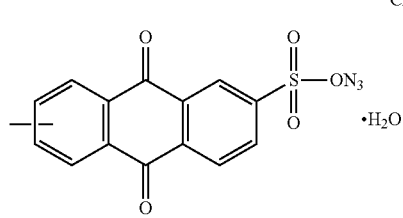

Chemical Formula 3

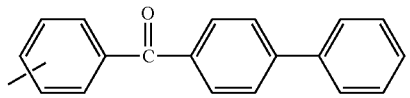

Chemical Formula 4

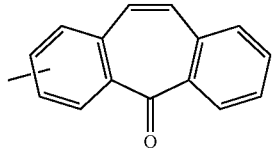

Chemcial Formula 5

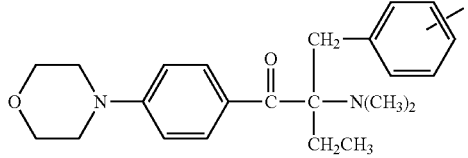

Chemical Formula 6

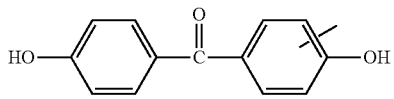

Chemical Formula 7

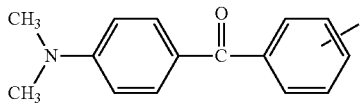

Chemical Formula 8

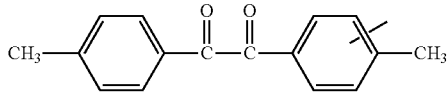

Chemical Formula 9

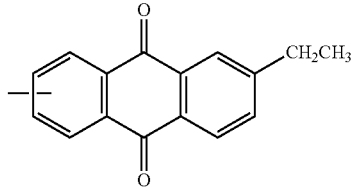

Chemical Formula 10

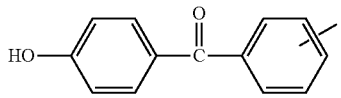

Chemical Formula 11

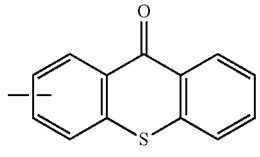

Chemical Formula 12

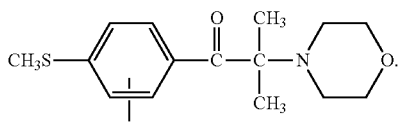

The reactive mesogen may include a compound represented by the following Chemical Formula 13:

R1-S1-P1-E-P2-S2-R2        Chemical Formula 13 wherein, in Chemical Formula 13, R1 and R2 may each independently include one of acrylate and methacrylate, S1 and S2 may each independently include a substituted or non-substituted C1 to C4 alkylene group or a single bond, P1 and P2 may each independently include a substituted or non-substituted

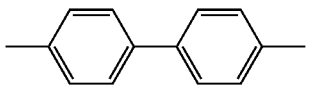

or a substituted or non-substituted

and E may include one of —O—, —S—, —CO—, —CO—O—, —OCO—, —O—CO—O—, —OCH$_2$—, —CH$_2$O—, —COO—, —O—CH$_2$—CH$_2$—O—, or a single bond.

The reactive mesogen may include a compound represented by one of the following Chemical Formula 14 to Chemical Formula 21:

A pre-tilt angle of a liquid crystal molecule that is adjacent to the first alignment layer may be greater than a pre-tilt angle of a liquid crystal molecule that is adjacent to the second alignment layer.

The liquid crystal display may be a curved display.

The light wavelength range may be about 250 nm to about 450 nm.

The embodiments may be realized by providing a liquid crystal display including a first substrate; a second substrate overlapping the first substrate at a distance therefrom; a liquid crystal layer between the first substrate and the second substrate, the liquid crystal layer including a plurality of liquid crystal molecules; a first alignment layer between the first substrate and the liquid crystal layer, the first alignment layer including a first polymer; and a second alignment layer between the second substrate and the liquid crystal layer, the second alignment layer including a second polymer, wherein a pre-tilt angle of a liquid crystal molecule that is adjacent to the first alignment layer is greater than that of a liquid crystal molecule that is adjacent to the second alignment layer, the first polymer includes a first main chain and a plurality of first side chains connected to the first main chain, at least one of the plurality of first side chains including a photoreactive group or a photoreactive derivative group, and Chemical Formula 14

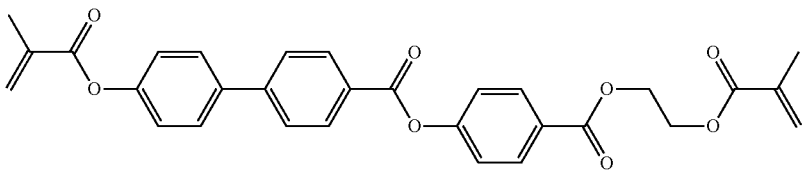

Chemical Formula 15

Chemical Formula 16

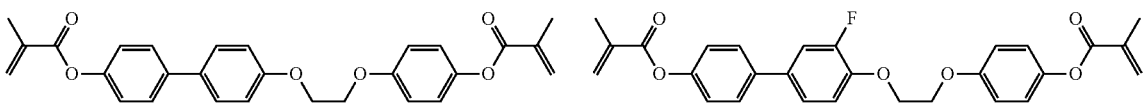

Chemical Formula 17

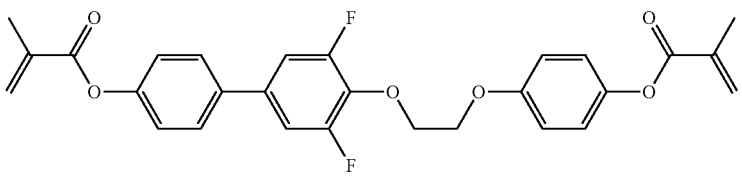

Chemical Formula 18

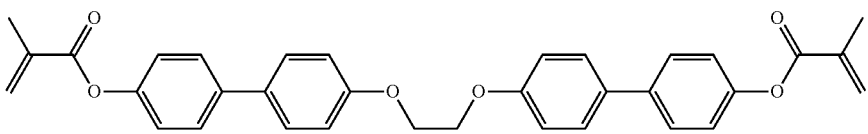

Chemical Formula 19

Chemical Formula 20

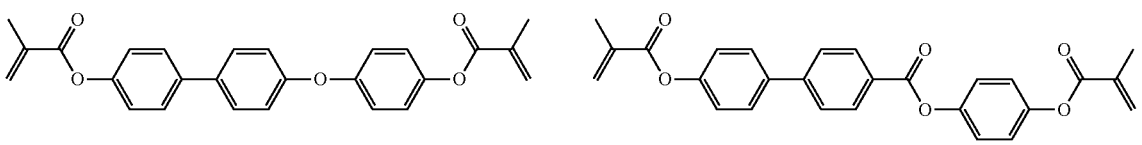

Chemical Formula 21

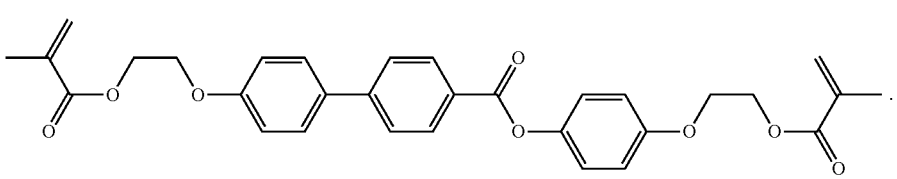

the photoreactive group includes a group represented by one of the following Chemical Formula B1 or Chemical Formula B2:

Chemical Formula B1

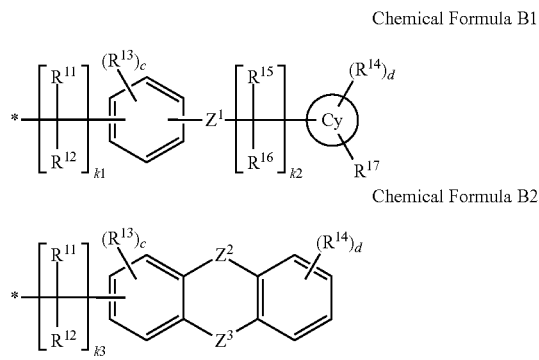

Chemical Formula B2 wherein, in Chemical Formula B1 and Chemical Formula B2, Cy may be a C6 to C18 aryl group or a C6 to C18 cycloalkyl group, $R^{11}$ to $R^{14}$ may each independently include hydrogen or a substituted or unsubstituted C1 to C8 alkyl group, $R^{15}$ and $R^{16}$ may each independently include a hydroxy group or a substituted or unsubstituted C1 to C8 alkoxy group, $R^{17}$ may be hydrogen, a hydroxy group, or a substituted or unsubstituted C1 to C8 alkoxy group, c and d may each independently be integers of 0 to 4, k1 and k3 may each independently be integers of 3 to 20, k2 may be an integer of 0 to 5, Z1 and Z2 may be —C(=O)—, and Z3 may be —S— or —C(=O)—.

The liquid crystal display may further include a plurality of protrusions between the first alignment layer and the liquid crystal layer, wherein at least one of the plurality of protrusions includes an alignment polymer polymerized from a reactive mesogen, and the first polymer has a reactivity in response to being exposed to light within a light wavelength range for forming the alignment polymer that is greater than a reactivity of the reactive mesogen within the light wavelength range.

The reactive mesogen may include a compound represented by the following Chemical Formula 13:

   Chemical Formula 13 wherein, in Chemical Formula 13, R1 and R2 may each independently include an acrylate or a methacrylate, S1 and S2 may each independently include a substituted or non-substituted C1 to C4 alkylene group or a single bond, P1 and P2 may each independently include a substituted or non-substituted

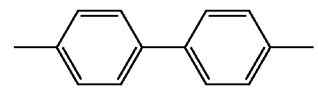

or a substituted or non-substituted

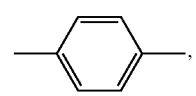, and E may include —O—, —S—, —CO—, —CO—O—, —OCO—, —O—CO—O—, —OCH$_2$—, —CH$_2$O—, —COO—, —O—CH$_2$—CH$_2$—O—, or a single bond.

The reactive mesogen may include a compound represented as given in Chemical Formula 14 to Chemical Formula 21:

Chemical Formula 14

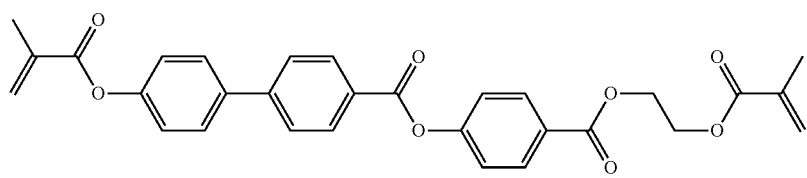

Chemical Formula 15                                Chemical Formula 16

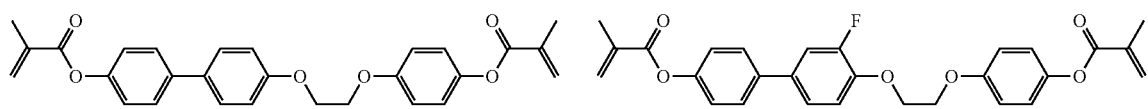

Chemical Formula 17

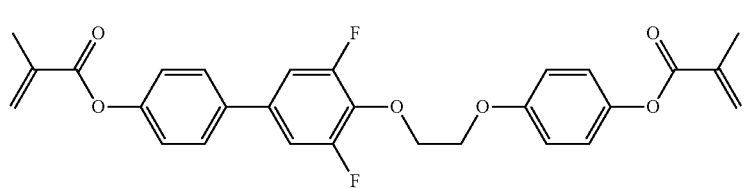

Chemical Formula 18

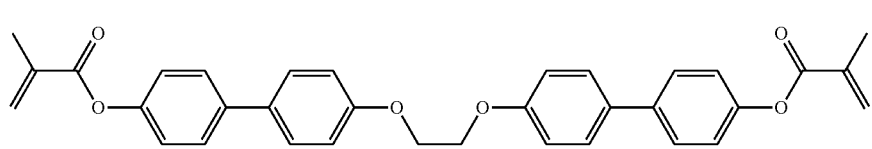

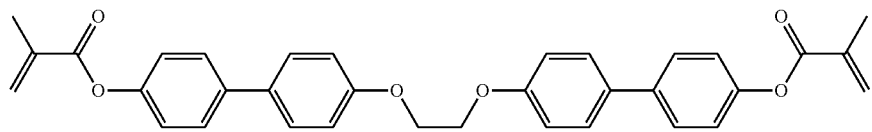

Chemical Formula 19

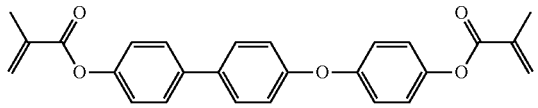

Chemical Formula 20

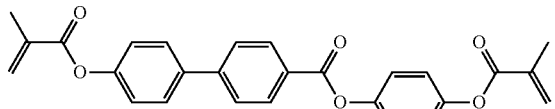

Chemical Formula 21

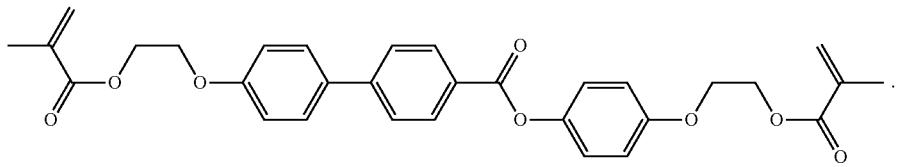

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
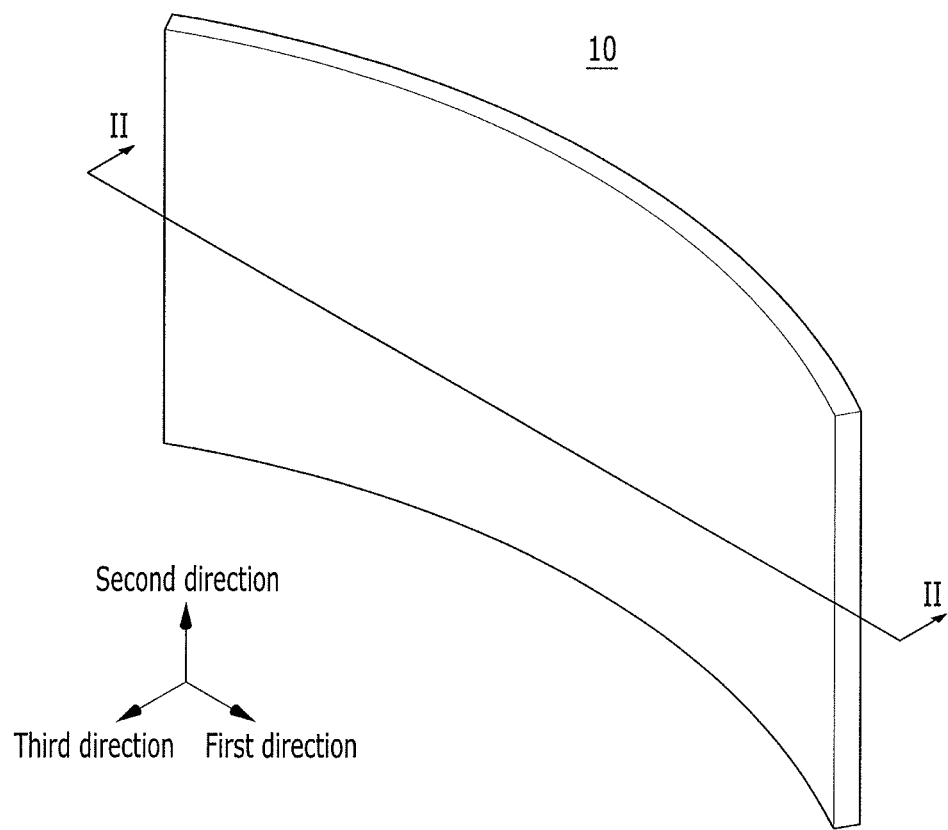
FIG. 1 illustrates a schematic perspective view of a curved liquid crystal display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer is referred to as being "between" two layers, it can be the only layer between the two layers, or one or more intervening layers may also be present. Like reference numerals refer to like elements throughout.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "on" means positioning on or below a referential portion, but does not essentially mean positioning on the upper side of the portion based on a gravitational direction.

In addition, unless explicitly described to the contrary, the word "comprise" or "include" and variations such as "comprises", "includes", "including", or "comprising" will be understood to imply the inclusion of stated elements but not the exclusion of any other elements.

Further, in this specification, the phrase "in a plan view" means viewing a target portion from the top, and the phrase "in a cross-section" means viewing a cross-section by vertically cutting a target portion from the side.

Unless particularly mentioned in the present specification, the term "substituted" refers to at least one hydrogen atom being substituted or replaced by a substituent group of a halogen atom (F, Cl, Br, and I), a hydroxy group, a C1 to C20 alkoxy group, a nitro group, a cyano group, an amino group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C30 heteroaryl group, or a combination thereof.

Further, unless particularly mentioned in the present specification, the prefix "hetero" means that at least one heteroatom of N, O, S, and P is included in a cyclic group.

Further, unless particularly mentioned in the present specification, the term "alicyclic" means C3 to C40 cycloalkyl, C3 to C40 cycloalkenyl, C3 to C40 cycloalkynyl, C3 to C40 cycloalkylene, C3 to C40 cycloalkenylene, or C3 to C40 cycloalkynylene, and specifically means C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene, and the term "aromatic" means C6 to C40 aryl, C2 to C40 heteroaryl, C6 to C40 arylene, or C2 to C40 heteroarylene, and specifically means C6 to C16 aryl, C2 to C16 heteroaryl, C6 to C16 arylene, or C2 to C16 heteroarylene.

Unless particularly mentioned in the present specification, the term "combination" generally means mixing or copolymerization, and means that in an alicyclic organic group and an aromatic organic group, two or more cycles form a fused cycle or two or more cycles are connected to each other by a group of a single bond, —O—, —S—, —C(=O)—, —CH(OH)—, —S(=O)—, —S(=O)$_2$—, —Si(CH$_3$)$_2$—, —(CH$_2$)p- (herein, 1≤p≤2), —(CF$_2$)q- (herein, 1≤q≤2), —C(CH$_3$)$_2$—, —CH(CH$_3$)—, —C(CF$_3$)$_2$—, —CH(CF$_3$)—, or —C(=O)NH—. Herein, the term "copolymerization" means block copolymerization or random copolymerization, and the term "copolymer" means a block copolymer or a random copolymer.

Hereinafter, a display device according to an exemplary embodiment will be described with reference to FIG. 1 to FIG. 3. FIG. 1 illustrates a schematic perspective view of a curved liquid crystal display according to an exemplary embodiment, FIG. 2 illustrates a cross-sectional view of FIG. 1 taken along the line II-II, and FIG. 3 illustrates a graph of absorbance of a photoreactive mesogen and a photoreactive group with respect to light wavelengths.

Referring to FIG. 1, a liquid crystal display according to an exemplary embodiment may be a curved type of liquid crystal display. A liquid crystal display 10 may be curved with reference to an axis that is parallel with a horizontal direction, which is the first direction in the drawing, or may be curved with reference to an axis that is parallel with a vertical direction, which is the second direction. The present specification describes a liquid crystal display curved with reference to an axis that is parallel with the second direction. In an implementation, the liquid crystal display can be curved in an axis that is parallel with the first direction.

Figure 2:
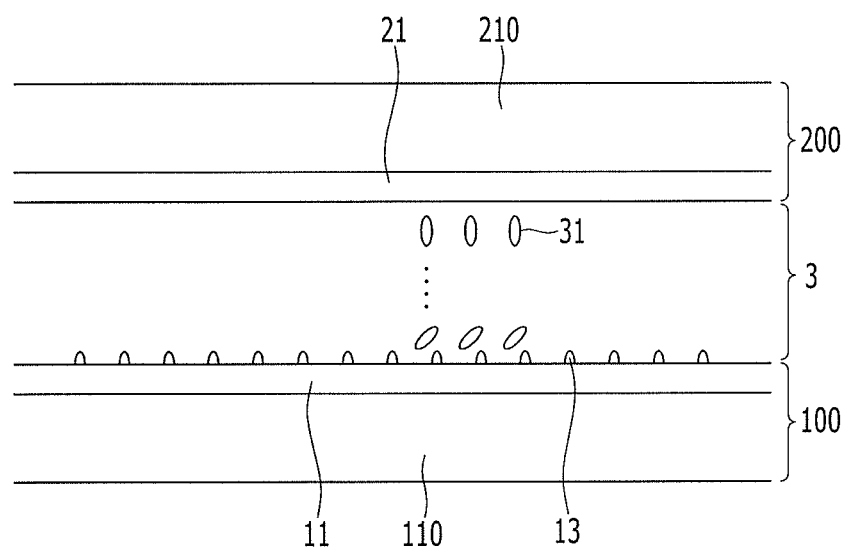
FIG. 2 illustrates a cross-sectional view of FIG. 1, taken along the line II-II.
Figure 3:
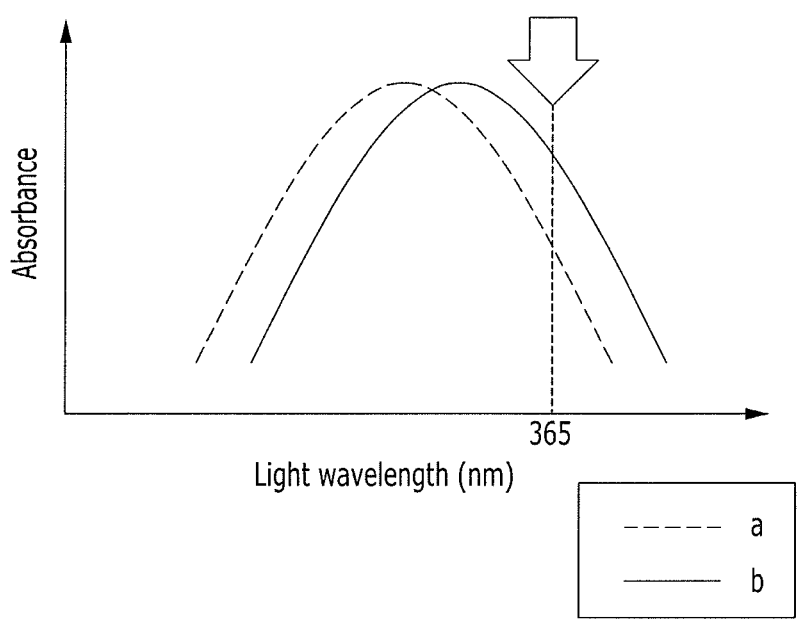
FIG. 3 illustrates a graph of absorbance of a photoreactive mesogen and a photoreactive group with respect to light wavelengths.

Referring to FIG. 1 and FIG. 2, the liquid crystal display 10 may include a lower panel 100, an upper panel 200 overlapping the lower panel 100 at a distance therefrom (e.g., the upper panel 200 may face and may be spaced apart from the lower panel 100), and a liquid crystal layer 3 between the lower panel 100 and the upper panel 200. The liquid crystal layer 3 may include a plurality of liquid crystal molecules 31.

The lower panel 100 may include a first substrate 110, a first alignment layer 11 between the first substrate 110 and the liquid crystal layer 3, and a plurality of protrusions 13 between the first alignment layer 11 and the liquid crystal layer 3. The protrusion 13 may include an alignment polymer polymerized with or from a reactive mesogen or may include an alignment polymer lump, which is the alignment polymer disposed adjacent to the surface of the first alignment layer 11.

Among the plurality of liquid crystal molecules 31, liquid crystal molecules 31 adjacent to the first alignment layer 11 may have a pre-tilt. For example, even when the liquid crystal layer 3 is in a state in which no voltage is applied thereto, the liquid crystal molecules 31 that are adjacent to the first alignment layer 11 may be tilted with reference to a direction that is substantially perpendicular to one surface of the first alignment layer 11 due to the protrusions 13.

The pre-tilt stated in the exemplary embodiment refers to the liquid crystal molecules 31 being tilted with reference to a direction that is perpendicular to one surface of the first alignment layer 11 or a second alignment layer 21. "Pre-tilt angle" refers to the degree of tilting of the liquid crystal molecules 31 with respect to an axis that is perpendicular to the first alignment layer 11 or the second alignment layer 21, e.g., a tilted angle.

The upper panel 200 may include a second substrate 210 and the second alignment layer 21 between the second substrate 210 and the liquid crystal layer 3.

Among the plurality of liquid crystal molecules 31 included in the liquid crystal layer 3, liquid crystal molecules 31 that are adjacent to the second alignment layer 21 may not have a pre-tilt. For example, in a state which no voltage is applied, the liquid crystal molecules 31 that are adjacent to the second alignment layer 21 may be aligned substantially perpendicular to the surface of the second alignment layer 21.

The liquid crystal layer 3 between the lower panel 100 and the upper panel 200 may have negative dielectric anisotropy.

Hereinafter, the first alignment layer 11 and the second alignment layer 21 will be described in detail.

In the present exemplary embodiment, the first alignment layer 11 may include a first polymer. The first polymer may include, e.g., a first main chain and a plurality of side chains connected to the first main chain.

The first main chain may include, e.g., a polyimide or the like. Each of the plurality of first side chains may include, e.g., a vertical alignment group, a photoreactive group, or a photoreactive derivative group. In an implementation, one side chain may include only one of the vertical alignment group, the photoreactive group, or the photoreactive derivative group. In an implementation, the vertical alignment group may be directly connected to the main chain and the photoreactive group and the photoreactive derivative group are coupled to the vertical alignment group. As used herein, the term "or" is not an exclusive term such that "A or B" would include any and all combinations thereof, e.g., "A", "B", and "A and B".

In the present specification, the photoreactive derivative refers group to a similar compound or group acquired from transformation of a part of the photoreactive group.

The photoreactive group may absorb energy from irradiated light to generate radicals that help polymerization of the reactive mesogen or may react with the reactive mesogen. The vertical alignment group may substantially perpendicularly align the liquid crystal molecules 31 that are adjacent to the first alignment layer 11.

The photoreactive group according to the present exemplary embodiment may include various materials that generate radicals or help polymerization. In an implementation, the photoreactive group may include a group represented by one of the following Chemical Formula 1 to Chemical Formula 12.

Chemical Formula 1

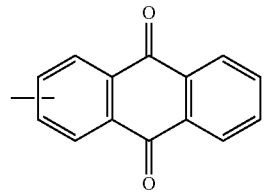

Chemical Formula 2

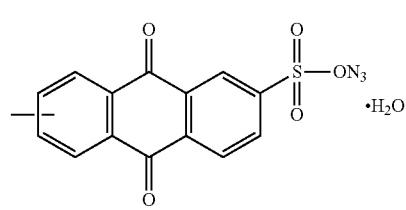

Chemical Formula 3

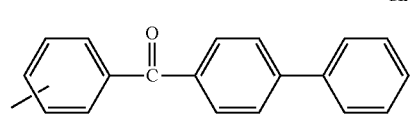

Chemical Formula 4

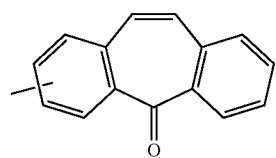

-continued

Chemical Formula 5

Chemical Formula 6

Chemical Formula 7

Chemical Formula 8

Chemical Formula 9

Chemical Formula 10

Chemical Formula 11

Chemical Formula 12

The second alignment layer 21 may include a second polymer. In an implementation, the second polymer may be different from the first polymer. The second polymer may include, e.g., a second main chain and a plurality of second side chains connected to the second main chain. Each of the plurality of second side chains may include a vertical alignment group. The vertical alignment group may vertically align liquid crystal molecules 31 that are adjacent to the second alignment layer 21.

Unlike the first side chain, the second side chain may not include a photoreactive group or a photoreactive derivative group. The reactive mesogen may move to be adjacent to the light-irradiated photoreactive functional group. As noted above, the second polymer may not include the photoreactive functional group, and the reactive mesogen may not be adjacent to the second alignment layer 21. Thus, the protrusions 13 including the alignment polymer polymerized with the reactive mesogen may not be formed between the second alignment layer 21 and the liquid crystal layer 3.

For example, the plurality of protrusions 13 may be between the first alignment layer 11 and the liquid crystal layer 3 and are may not be between second alignment layer 21 and the liquid crystal layer 3. The protrusions 13 may protrude from one side of the first alignment layer 11. The protrusions 13 may pre-tilt the liquid crystal molecules 31 that are adjacent to the first alignment layer 11.

For example, the reactive mesogen mixed with the alignment material (e.g., including the first polymer) to form the first alignment layer 11 may be discharged or diffuse to the liquid crystal layer 3 during a baking process. For example, a preliminary first alignment layer may include the reactive mesogen and the first polymer. Next, by irradiating light to the liquid crystal layer 3, the reactive mesogen may be polymerized by radicals from the photoreactive group such that an alignment polymer may be formed (e.g., of just the polymerized reactive mesogen), or the reactive mesogen and the photoreactive group of the first polymer may react with each other such that the alignment polymer (e.g., from both the reactive mesogen and the first polymer) may be formed. The protrusions 13 according to the exemplary embodiment may include such an alignment polymer or a lump where the alignment polymer is concentrated.

In an implementation, the reactive mesogen may include, e.g., a compound represented by the following Chemical Formula 13.

R1-S1-P1-E-P2-S2-R2   Chemical Formula 13

In Chemical Formula 13, R1 and R2 may each independently include, e.g., an acrylate or a methacrylate, S1 and S2 may each independently include, e.g., a substituted or non-substituted C1 to C4 alkylene group or a single bond, P1 and P2 may each independently include, e.g., a substituted or non-substituted or a substituted or non-substituted

, and E may include, e.g., —O—, —S—, —CO—, —CO—O—, —OCO—, —O—CO—O—, —OCH$_2$—, —CH$_2$O—, —COO—, —O—CH$_2$—CH$_2$—O—, or a single bond. When S1 and S2 are single bonds, R1 and P1 or R2 and P2 may be directly bonded without interposing an intermediate material therebetween.

The compound represented by Chemical Formula 13 may include at least three rings. The reactive mesogen including at least three rings may have improved heat resistance, and when the alignment layers 11 and 21 are formed by curing the coated alignment material, the alignment layers 11 and 21 may be stable under a high-temperature heat treatment condition.

In an implementation, the reactive mesogen may include, e.g., a compound represented by one of the following Chemical Formula 14 to 21.

Chemical Formula 14

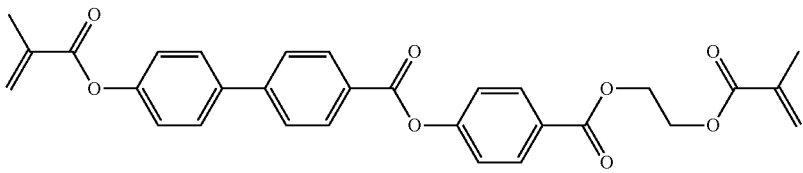

Chemical Formula 15

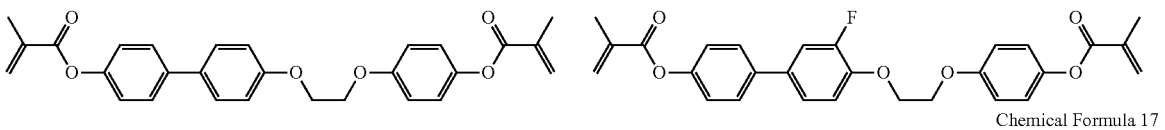

Chemical Formula 16

Chemical Formula 17

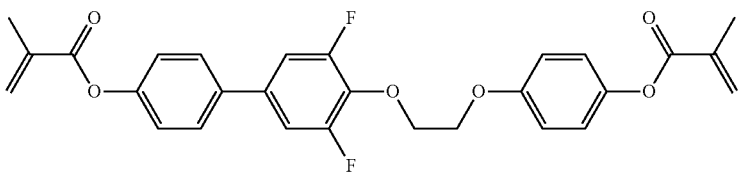

Chemical Formula 18

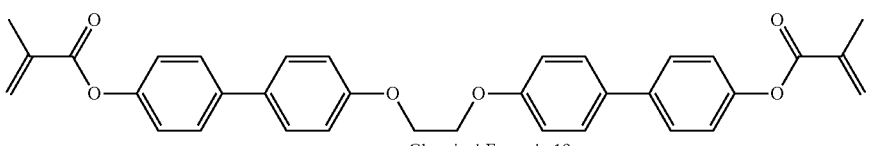

Chemical Formula 19

Chemical Formula 20

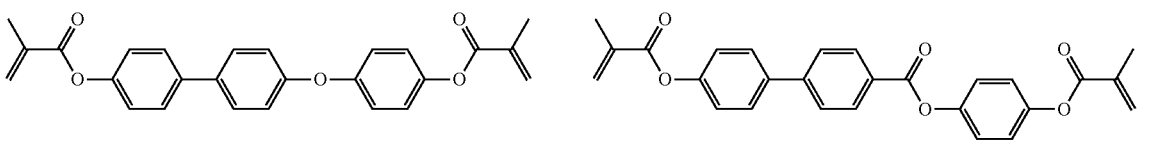

Chemical Formula 21

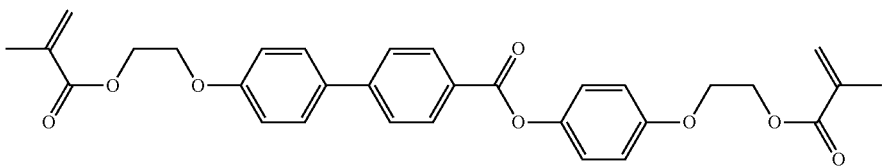

The reactive mesogen according to an embodiment may include the compound represented by Chemical Formula 13, and may be polymerized as an alignment polymer by light irradiation. At least one of the plurality of protrusions 13 may include such an alignment polymer or a lump of the alignment polymers.

The plurality of protrusions 13 may be disposed only on the first alignment layer 11, and may cause the liquid crystal molecules 31 adjacent to the first alignment layer 11 to be pre-tilted. In an implementation, no protrusion 13 may be provided between the second alignment layer 21 and the liquid crystal layer 3, and the liquid crystal molecules 31 adjacent to the second alignment layer 21 may not be pre-tilted.

In an implementation, the plurality of liquid crystal molecules 31 may be injected between the lower panel 100 and the upper panel 200, and then a voltage may be applied and predetermined light (e.g., ultraviolet (UV)) may be irradiated thereto. When the light is irradiated, the above-stated photoreactive group may generate radicals or may be activated. Then, the radicals or the activated photoreactive group may boost a polymerization reaction of the reactive mesogen, and the polymerized reactive mesogen may form an alignment polymer such that the plurality of protrusions 13 provided on the first alignment layer 11 are formed. The plurality of protrusions 13 may cause the liquid crystal molecules 31 that are adjacent to the first alignment layer 11 and the protrusions 13 to be pre-tilted.

In this case, referring to FIG. 3, absorbance (denoted as b in FIG. 3) of the photoreactive group included in the first alignment layer 11 may be greater than absorbance (denoted as a in FIG. 3) of the reactive mesogen in a part of a wavelength range.

The light wavelength range may be a suitable wavelength range for reaction between the photoreactive group and the reactive mesogen. In an implementation, the light wavelength range may be a light wavelength range for forming radicals from activation of the photoreactive group or forming the alignment polymer by activation of the reactive mesogen. In an implementation, the light wavelength range may be, e.g., a UV wavelength of about 250 nm to about 450 nm.

A reaction at a predetermined wavelength (about 365 nm) shown in FIG. 3 will be exemplarily described.

When the irradiated light has a wavelength of about 365 nm, the radicals generated from the photoreactive group may be distributed or concentrated in an area that is adjacent to the first alignment layer 11, or the activated photoreactive group may introduce or react with the reactive mesogen near the first alignment layer 11.

Accordingly, a polymerization reaction of the reactive mesogen may occur in the area that is adjacent to the first alignment layer 11, and resultantly protrusions 13 (including the alignment polymer polymerized with or from the reactive mesogen) may be formed between the first alignment layer 11 and the liquid crystal layer 3. The protrusions 13 may cause the liquid crystal molecules 31 disposed adjacent to the first alignment layer 11 to be pre-tilted.

Meanwhile, the second polymer that forms the second alignment layer 21 may not include an additional photoreactive functional group, and therefore, no reaction (such as generation of radicals or introduction of the reactive mesogen through an activated photoreactive group) may occur. Thus, in the liquid crystal display according to an embodiment, no protrusion may be formed between the second alignment layer 21 and the liquid crystal layer 3, and liquid crystal molecules 31 that are adjacent to the second alignment layer 21 may be vertically arranged rather than having a pre-tilt.

As previously described, the liquid crystal molecules 31 that are adjacent to the first alignment layer 11 may have the pre-tilt, and the liquid crystal molecules 31 that are adjacent to the second alignment layer 21 may not have the pre-tilt. Even if the lower panel 100 and the upper panel 200 were to be misaligned, the liquid crystal molecules 31 that are adjacent to the lower panel 100 and the liquid crystal molecules 31 that are adjacent to the upper panel 200 may not have directional misalignment therebetween, thereby controlling generation of a texture.

If the reactive mesogen were to have a higher reactivity than the photoreactive group, the amount of radicals generated by the photoreactive group may be low, and a reaction for introducing or concentrating the reactive mesogen near to the first alignment layer 11 could weaken. Further, the reactive mesogen (which is in a state of being discharged to the liquid crystal layer 3 and then being activated) could move adjacent not only to the first alignment layer 11 but also to the second alignment layer 21 such that the reactive mesogen could be disposed not only between the first alignment layer 11 and the liquid crystal layer 3 but also between the second alignment layer 21 and the liquid crystal layer 3. Thus, the protrusions 13 including the alignment polymer polymerized with or from the reactive mesogen could be disposed between the first alignment layer 11 and the liquid crystal layer 3 and between the second alignment layer 21 and the liquid crystal layer 3. The liquid crystal molecules 31 that are adjacent to the first alignment layer 11 and the second alignment layer 21 may all have the pre-tilt.

If a flat display panel (where the liquid crystal molecules 31 have the pre-tilt in the same direction) were to be bent between the opposing lower and upper panels 100 and 200, an area where the pre-tilt direction of the liquid crystal molecules 31 that are adjacent to the lower panel 100 and the pre-tilt direction of the liquid crystal molecules 31 that are adjacent to the upper panel 200 are mismatched could be formed. Such an area may occur at an interface between neighboring domains, and a texture fault could occur in the area.

Hereinafter, the first polymer and the second polymer according to the exemplary embodiment will be described in detail.

The first polymer (included in the first alignment layer 11) may include a first structure unit represented by the following Chemical Formula A and a second structure unit represented by the following Chemical Formula B.

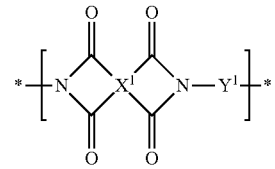

Chemical Formula A

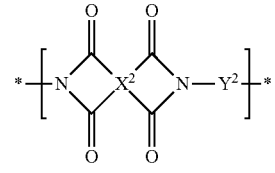

Chemical Formula B

In Chemical Formula A and Chemical Formula B, $X^1$ and $X^2$ may each independently be, e.g., tetravalent organic groups respectively induced from or including an alicyclic acid dianhydride or an aromatic acid dianhydride, $Y^1$ may be, e.g., a divalent organic group induced from or including an aromatic diamine and at least one hydrogen of the divalent organic group may be substituted with a group represented by Chemical Formula A1, and $Y^2$ may be, e.g., a divalent organic group induced from or including an aromatic diamine, wherein at least hydrogen of the divalent organic group is substituted with a group represented by Chemical Formula B1 or Chemical Formula B2.

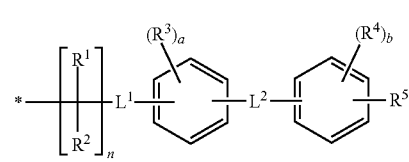

Chemical Formula A1

In Chemical Formula A1, $R^1$ to $R^4$ may each independently be or include, e.g., hydrogen or a substituted or unsubstituted C1 to C8 alkyl group, n may be, e.g., an integer of 3 to 20, $R^5$ may include, e.g., a substituted or unsubstituted C1 to C30 alkyl group, a and b may each independently be, e.g., an integer of 0 to 4, $L^1$ and $L^2$ may each independently be, e.g., a single bond, —O—, —S(=O)$_2$—, or —(C($R^x$)($R^y$))$_m$— ($R^x$ and $R^y$ may each independently be or include, e.g., a hydrogen atom or a substituted or unsubstituted C1 to C8 alkyl group, and m may be, e.g., an integer of 1 to 20).

$Y^1$ is a divalent organic group induced from or including an aromatic diamine, and when at least one hydrogen of the divalent organic group is substituted with a group represented by Chemical Formula A1, the group represented by Chemical Formula A1 may function as a vertical aligner that vertically aligns the liquid crystal molecules 31 that are adjacent to the first alignment layer 11.

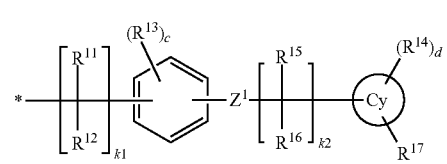

Chemical Formula B1

Chemical Formula B2

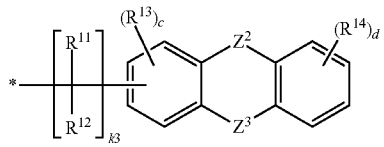

In Chemical Formula B1 and Chemical Formula B2, Cy may be, e.g., a C6 to C18 aryl group or a C6 to C18 cycloalkyl group, $R^{11}$ to $R^{14}$ may each independently be or include, e.g., hydrogen or a substituted or unsubstituted C1 to C8 alkyl group, $R^{15}$ and $R^{16}$ may each independently be or include, e.g., a hydroxy group or a substituted or unsubstituted C1 to C8 alkoxy group, $R^{17}$ may be or may include, e.g., hydrogen, a hydroxy group, or a substituted or unsubstituted C1 to C8 alkoxy group, c and d may each independently be, e.g., integers of 0 to 4, k1 and k3 may each independently be, e.g., integers of 3 to 20, k2 may be, e.g., an integer of 0 to 5, Z1 and Z2 may be, e.g., —C(=O)—, and Z3 may be, e.g., —S— or —C(=O)—.

The group represented by Chemical Formula B1 or Chemical Formula B2 may include or correspond with a photoreactive group or a photoreactive derivative group represented by Chemical Formula 1 to Chemical Formula 12.

In an implementation, the second polymer included in the second alignment layer 21 may include a first structure unit represented by Chemical Formula A and may not include a second structure unit represented by Chemical Formula B. For example, the second polymer may not include a photoreactive group or a photoreactive derivative group.

The first polymer and the second polymer including the above-stated structure units may include a polyimide. The polyimide may be manufactured by manufacturing polyamic acid formed by copolymerizing at least one acid dianhydride selected from an alicyclic acid dianhydride and an aromatic acid dianhydride, and an aromatic diamine, and imidizing the polyamic acid. As a method of manufacturing the polyamic acid, a method suitable for synthesizing of the polyamic acid may be applied.

In an implementation, the alicyclic acid dianhydride may include, e.g., 1,2,3,4-cyclobutanetetracarboxylic acid dianhydride (CBDA), 2,3,4,5-tetrahydrofurantetracarboxylic acid dianhydride, 5-(2,5-dioxotetrahydrofuryl)-3-methylcyclohexane-1,2-dicarboxylic anhydride (DOCDA), bicyclooctene-2,3,5,6-tetracarboxylic acid dianhydride (BODA), 1,2,3,4-cyclopentanetetracarboxylic dianhydride (CPDA), 1,2,4,5-cyclohexanetetracarboxylic acid dianhydride (CHDA), 1,2,4-tricarboxy-3-methylcarboxy cyclopentane dianhydride, 1,2,3,4-etracarboxy cyclopentane dianhydride, 3,4-dicarboxy-1-cyclohexyl succinic acid dianhydride, 3,4-dicarboxy-1,2,3,4-tetrahydro-1-naphthalenesuccinic acid dianhydride, or 2,3,5-tricarboxycyclopentyl acetic dianhydride (TCA-AH).

In an implementation, the aromatic acid dianhydride may include, e.g., pyromellitic acid dianhydride (PMDA), biphthalic acid anhydride (BPDA), oxydiphthalic acid dianhydride (ODPA), benzophenone tetracarboxylic acid dianhydride (BTDA), or (hexafluoroisopropylidene)diphthalic dianhydride (6-FDA).

To summarize, the photoreactive group according to the exemplary embodiment may have higher light absorbance and/or higher reactivity than the photoreactive mesogen in a wavelength of light irradiated to the display device during a manufacturing process. Accordingly, reaction from the photoreactive group may be excellent compared to reaction from the reactive mesogen upon light irradiation. For example, the reaction of the photoreactive group may proceed at a higher rate than that of the reactive mesogen, upon light irradiation.

A majority of radicals may be distributed or concentrated in an area that is adjacent to the first alignment layer 11 (that includes the first polymer having the photoreactive group), and reactive mesogen may form an alignment polymer at the periphery of the first alignment layer 11 or the activated photoreactive group may induce the reactive mesogen to be near the first alignment layer 11 such that the alignment polymer may be formed.

For example, a reaction for forming the protrusions 13 may be predominantly performed near the first alignment layer 11, and the protrusions 13 may be formed only at the periphery of the first alignment layer 11 (and the protrusions 13 may not be formed at the periphery of the second alignment layer 21).

Accordingly, a liquid crystal display wherein the liquid crystal molecules that are adjacent to the first alignment layer 11 have a pre-tilt and the liquid crystal molecules that are adjacent to the second alignment layer 21 do not have a pre-tilt may be provided.

Further, the photoreactive group according to the exemplary embodiment may have excellent reactivity, most of the discharged reactive mesogen may form protrusions that include an alignment polymer or a lump of alignment polymers, and the plurality of protrusions may cause the liquid crystal molecules 31 that are adjacent to the first alignment layer 11 to be stably pre-tilted.

In addition, the high-reactive photoreactive group may be included, time consumed in the manufacturing process may be reduced while reducing manufacturing cost, and productivity may be improved.

Figure 4:
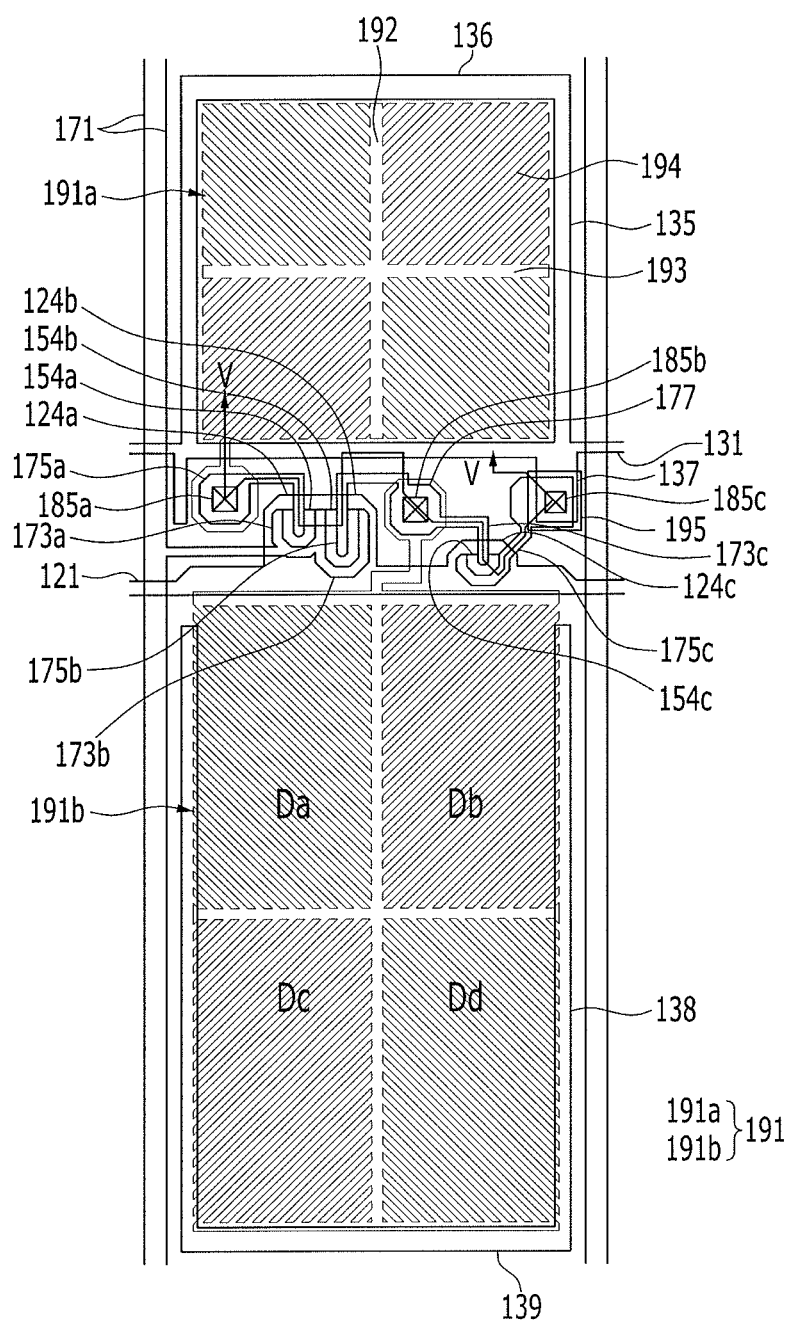
FIG. 4 illustrates a top plan view of a pixel in the liquid crystal display according to the exemplary embodiment.
Figure 5:
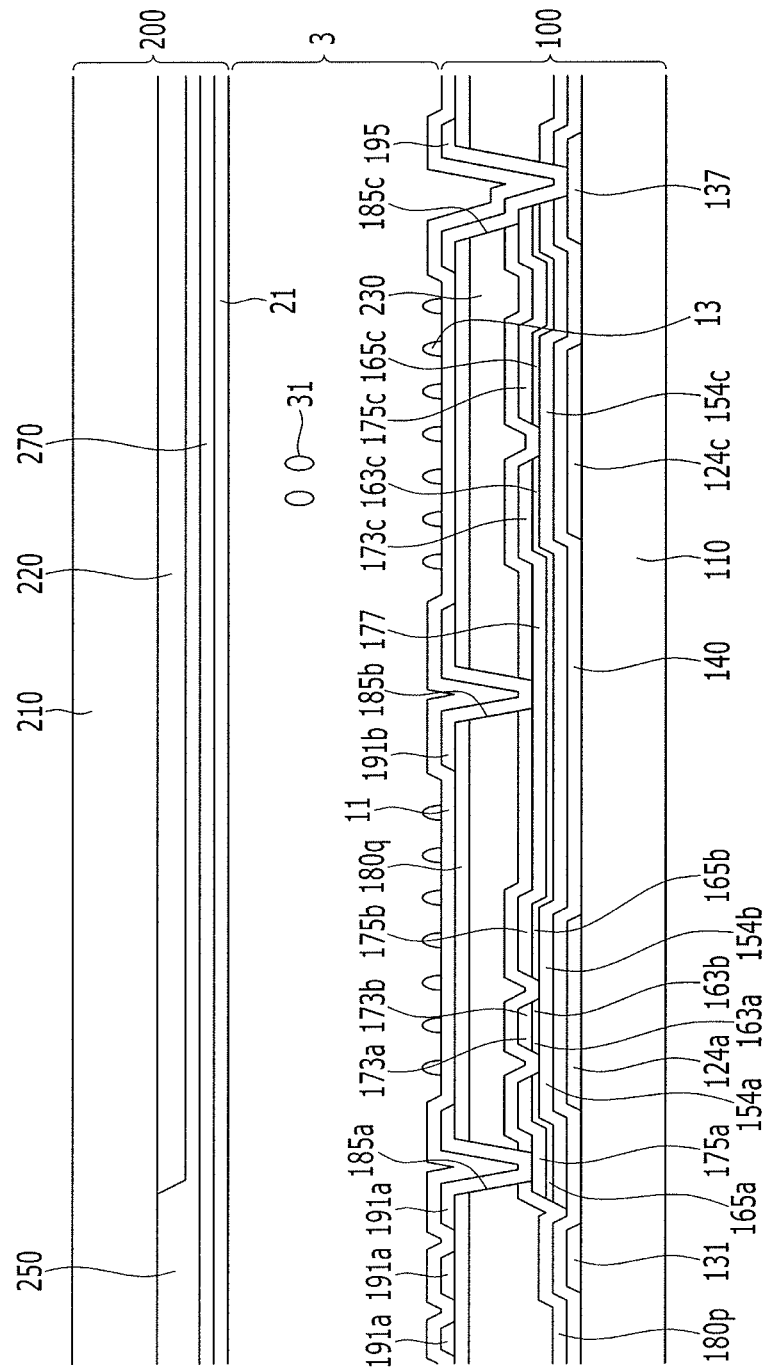
FIG. 5 illustrates a cross-sectional view of FIG. 4, taken along the line V-V.

Hereinafter, the liquid crystal display according to the exemplary embodiment will be described in detail. FIG. 4 illustrates a top plan layout view of a pixel in the liquid crystal display according to the exemplary embodiment, and FIG. 5 illustrates a cross-sectional view of FIG. 4, taken along the line V-V.

The lower panel 100 will now be described.

A gate conductor including gate lines 121 and divided reference voltage lines 131 may be provided on a first substrate 110 that is made of transparent glass or plastic.

The gate line 121 may include a first gate electrode 124a, a second gate electrode 124b, and a third gate electrode 124c.

The divided reference voltage line 131 may include first sustain electrodes 135 and 136 and a reference electrode 137. Although second storage electrodes 138 and 139 are not connected to the divided reference voltage line 131, the second storage electrodes 138 and 139 may be disposed to be overlapped with a second sub-pixel electrode 191b.

A gate insulation layer 140 is provided on the gate line 121 and the divided reference voltage line 131.

A first semiconductor layer 154a, a second semiconductor layer 154b, and a third semiconductor layer 154c may be provided on the gate insulating layer 140. Ohmic contacts 163a, 165a, 163b, 165b, 163c, and 165c are provided on the semiconductor layers 154a, 154b, and 154c.

A data conductor including data lines 171 connected to a first source electrode 173a and a second source electrode 173b, a first drain electrode 175a, a second drain electrode 175b, a third source electrode 173c, and a third drain electrode 175c may be provided on the ohmic contacts 163a, 165a, 163b, 165b, 163c, and 165c and the gate insulating layer 140.

The first gate electrode 124a, the first source electrode 173a, and the first drain electrode 175a may form a first thin film transistor, together with the first semiconductor layer 154a, the second gate electrode 124b, the second source electrode 173b, and the second drain electrode 175b may form a second thin film transistor, together with the second semiconductor layer 154b, and the third gate electrode 124c, the third source electrode 173c, and the third drain electrode 175c may form a third thin film transistor, together with the third semiconductor layer 154c.

The second drain electrode 175b may be connected with the third source electrode 173c, and includes a wide expansion portion 177.

A first passivation layer 180p may be provided on portions of the data conductors 171, 173c, 175a, 175b, and 175c and the semiconductor layers 154a, 154b, and 154c.

A color filter 230 may be provided on the first passivation layer 180p. The color filter 230 may vertically extend along two adjacent data lines 171. In an implementation, the color filter 230 may be included in, e.g., the lower panel 100. In an implementation, the color filter 230 may be included in, e.g., the upper panel 200.

A second passivation layer 180q may be provided on the color filter 230. The first passivation layer 180p and the second passivation layer 180q may include an inorganic insulation layer such as a silicon nitride or a silicon oxide.

The second passivation layer 180q may help prevent the color filter 230 from being lifted, and may help control contamination of the liquid crystal layer 3 caused by organic materials such as a solvent input by the color filters 230, in order to prevent faults such as an afterimage that may be induced when a screen is driven.

The first passivation layer 180p and second passivation layer 180q may include a first contact hole 185a and a second contact hole 185b that expose the first drain electrode 175a and the second drain electrode 175b.

The first passivation layer 180p, the second passivation layer 180q, and the gate insulating layer 140 may include a third contact hole 185c that partially exposes the reference electrode 137 and the third drain electrode 175c, and the third contact hole 185c may be covered by a connection member 195. The connection member 195 may electrically connect the reference electrode 137 and the third drain electrode 175, which are partially exposed through the third contact hole 185c, to each other.

A pixel electrode 191 may be provided on the second passivation layer 180q. The pixel electrode 191 may be one of field generating electrodes, and each pixel electrode 191 may be separated, interposing the gate line 121 therebetween, and thus includes a first sub-pixel electrode 191a and a second sub-pixel electrode 191b that neighbor each other in a column direction with reference to the gate line 121.

The pixel electrode 191 may be made of a transparent material such as ITO and IZO.

The entire shape of the first sub-pixel electrode 191a and the second sub-pixel electrode 191b may be quadrangular, and the first and second sub-pixel electrodes 191a and 191b may respectively include a cross stem formed of a horizontal stem 193 and a vertical stem 192 that perpendicularly crosses the horizontal stem 193. In addition, each of the first sub-pixel 191a and the second sub-pixel 191b may be divided into a first sub-region DA, a second sub-region Db, a third sub-region Dc, and a fourth sub-region Dd by the horizontal stem 193 and the vertical stem 192, and may include a plurality of minute branches 194 provided in the respective sub-regions Da to Dd.

The first sub-pixel electrode 191a and the second sub-pixel electrode 191b may be respectively connected with the first drain electrode 175a or the second drain electrode 175b through the first contact hole 185a and the second contact hole 185b, and receive a data voltage from the first drain electrode 175a and the second drain electrode 175b. In this case, a part of the data voltage applied to the second drain electrode 175b may be divided through the third source electrode 173c such that the voltage applied to the first sub-pixel electrode 191a becomes greater than the voltage applied to the second sub-pixel electrode 191b.

The first sub-pixel electrode 191a and the second sub-pixel electrode 191b applied with the data voltage may generate an electric field together with a common electrode 270 of the upper panel 200 such that a direction of the liquid crystal molecules 31 of the liquid crystal layer 3 disposed between the two electrodes 191 and 270 may be determined. Depending on the direction of the liquid crystal molecules 31, luminance of light passing through the liquid crystal layer 3 may be changed.

The description of the thin film transistors and the pixel electrode 191 described above is one example, and the structure of the thin film transistors and the design of the pixel electrode may be modified to enhance side visibility rather than being restricted to the above-described structure.

A first alignment layer 11 may be provided on the pixel electrode 191, and the first alignment layer 11 may be the above-stated first alignment layer 11 which has been described with reference to FIG. 1 to FIG. 3.

Next, the upper panel 200 will be described.

The second substrate 210 may be disposed to be overlapped with the first substrate 110 at a distance therefrom. A light blocking member 220 may be provided between the second substrate 210 and the liquid crystal layer 3. The light blocking member 220 may be provided in the upper panel 200 so as to overlap an area where the data line 171 of the lower panel 100 is disposed and an area where the thin film transistor is disposed. In the present exemplary embodiment, the light blocking member 220 may be included in the upper panel 200. The light blocking member 220 may be included in the lower panel 100.

An overcoat 250 may be disposed between the light blocking member 220 and the liquid crystal layer 3. In an implementation, the overcoat 250 may be omitted.

The common electrode 270, which is one of the field generating electrodes, may be provided between the overcoat 250 and the liquid crystal layer 3. The common electrode 270 may generate an electric field together with the pixel electrode 191 of the lower panel 100 such that a direction of the liquid crystal molecules 31 of the liquid crystal layer 3 may be determined.

A second alignment layer 21 may be provided between the common electrode 270 and the liquid crystal layer 3, and the second alignment layer 21 may be the above-stated second alignment layer 21 which has been described with reference to FIG. 1 to FIG. 3.

The liquid crystal layer 3 including a plurality of liquid crystal molecules 31 may be disposed between the first alignment layer 11 and the second alignment layer 21, and the liquid crystal layer 3 may have negative dielectric anisotropy.

By way of summation and review, liquid crystal displays are becoming wider, and curved display devices are being developed to enhance immersion and realism of viewers.

The embodiment provide a liquid crystal display that may help reduce and/or prevent deterioration of transmittance due to misalignment of an upper panel and a lower panel and may help control generation of a stain and a texture in the display panel.

According to an embodiment, deterioration of transmittance due to misalignment of an upper panel and a lower panel may be reduced and/or prevented, and generation of a stain and a texture in the display panel may be reduced and/or prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS

110: first substrate
11: first alignment layer
210: second substrate
21: second alignment layer
3: liquid crystal layer
31: liquid crystal molecule

What is claimed is:

1. A liquid crystal display, comprising:
   a first substrate;
   a second substrate overlapping the first substrate at a distance therefrom;
   a liquid crystal layer between the first substrate and the second substrate, the liquid crystal layer including a plurality of liquid crystal molecules;
   a first alignment layer between the first substrate and the liquid crystal layer, the first alignment layer including a first polymer;
   a second alignment layer between the second substrate and the liquid crystal layer, the second alignment layer including a second polymer; and
   a plurality of protrusions between the first alignment layer and the liquid crystal layer, wherein at least one of the plurality of protrusions includes an alignment polymer polymerized from a reactive mesogen,
   wherein the first polymer includes a first main chain and a plurality of first side chains connected to the first main chain, at least one of the plurality of first side chains including a photoreactive group or a photoreactive derivative group,
   wherein the photoreactive group or the photoreactive derivative group has an absorbance that is greater than that of the reactive mesogen within a light wavelength range for forming the alignment polymer,
   wherein the first polymer has a reactivity in response to being exposed to light within the light wavelength range for forming the alignment polymer that is greater than a reactivity of the reactive mesogen within the light wavelength range,
   wherein the light wavelength range is about 250 nm to about 450 nm, and
   wherein the number of protrusions disposed between the first alignment layer and the liquid crystal layer is larger than a number of protrusions disposed between the second alignment layer and the liquid crystal layer.

2. The liquid crystal display as claimed in claim 1, wherein the photoreactive group includes a group represented by one of the following Chemical Formula 1 to Chemical Formula 12:

Chemical Formula 1
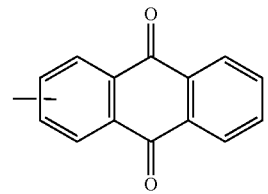

Chemical Formula 2
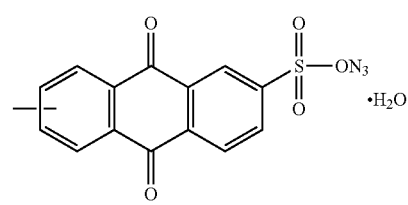

Chemical Formula 3
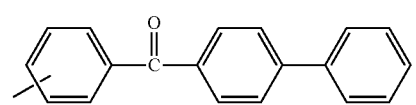

Chemical Formula 4
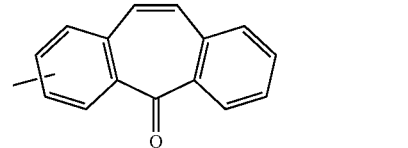

Chemical Formula 5

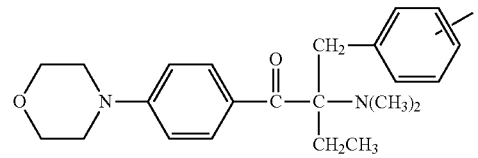

Chemical Formula 6
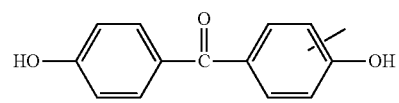

Chemical Formula 7
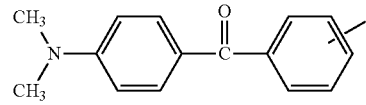

Chemical Formula 8
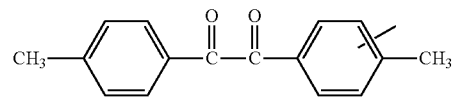

-continued

Chemical Formula 9

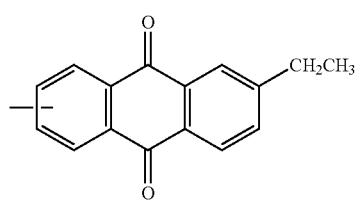

Chemical Formula 10

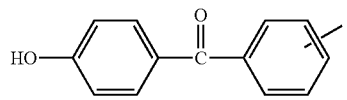

Chemical Formula 11

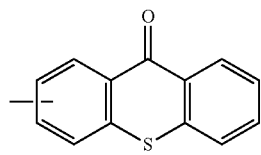

Chemical Formula 12

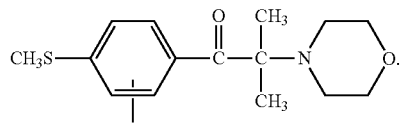

3. The liquid crystal display as claimed in claim 2, wherein the reactive mesogen includes a compound represented by the following Chemical Formula 13:

R1-S1-P1-E-P2-S2-R2    Chemical Formula 13 wherein, in Chemical Formula 13,

R1 and R2 each independently include an acrylate or a methacrylate,

S1 and S2 each independently include a substituted or non-substituted C1 to C4 alkylene group or a single bond, P1 and P2 each independently include a substituted or non-substituted

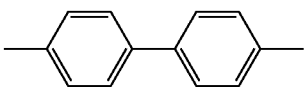

or a substituted or non-substituted

, and

E includes —O—, —S—, —CO—, —CO—O—, —OCO—, —O—CO—O—, —OCH$_2$—, —CH$_2$O—, —COO—, —O—CH$_2$—CH$_2$—O—, or a single bond.

4. The liquid crystal display as claimed in claim 3, wherein the reactive mesogen includes a compound represented as given in Chemical Formula 14 to Chemical Formula 21:

Chemical Formula 14

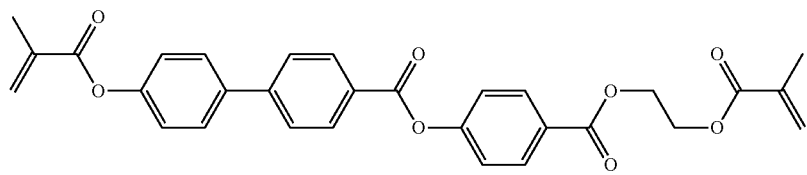

Chemical Formula 15

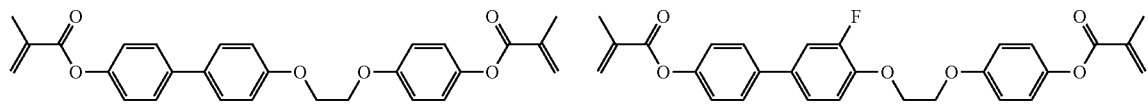

Chemical Formula 16

Chemical Formula 17

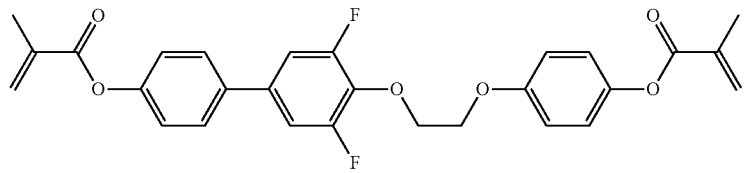

Chemical Formula 18

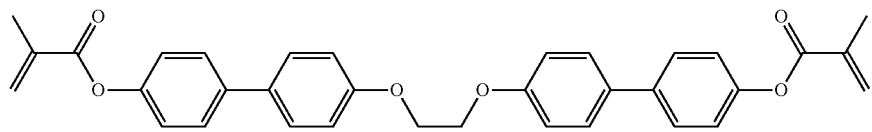

Chemical Formula 19    Chemical Formula 20

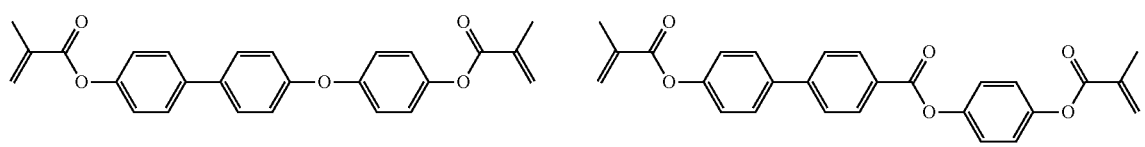

-continued

Chemical Formula 21

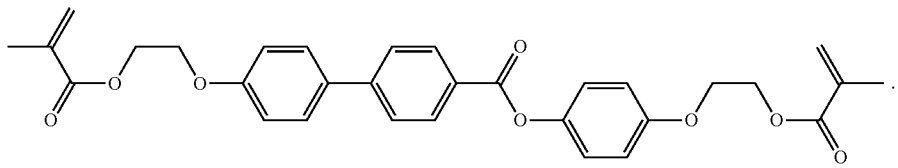

5. The liquid crystal display as claimed in claim 1, wherein a pre-tilt angle of a liquid crystal molecule that is adjacent to the first alignment layer is greater than that of a liquid crystal molecule that is adjacent to the second alignment layer.

6. The liquid crystal display as claimed in claim 1, wherein the liquid crystal display is a curved display.

7. The liquid crystal display as claimed in claim 1, wherein:
the second polymer includes a second main chain and a plurality of second side chains connected to the second main chain, and
at least one of the plurality of second side chains includes a vertical alignment group.

8. The liquid crystal display as claimed in claim 1, wherein at least one of the plurality of first side chains further includes a vertical alignment group.

9. The liquid crystal display as claimed in claim 1, further comprising:
a thin film transistor between the first substrate and the first alignment layer;
a pixel electrode connected with the thin film transistor; and
a common electrode forming an electric field with the pixel electrode.

10. A method of manufacturing a liquid crystal display, the method comprising:
preparing a lower panel including a first alignment layer on a first substrate;
preparing an upper panel including a second alignment layer on a second substrate;
forming a liquid crystal layer between the lower panel and the upper panel such that the liquid crystal layer includes a plurality of liquid crystal molecules; and
irradiating light to the lower panel, the upper panel, and the liquid crystal layer, which are bonded to each other,
wherein irradiating the light includes irradiating light to a first polymer and a reactive mesogen of the first alignment layer to form protrusions including an alignment polymer polymerized from the reactive mesogen,
wherein the first polymer includes a first main chain and a plurality of first side chains connected to the first main chain, at least one of the plurality of first side chains including a photoreactive group or a photoreactive derivative group,
wherein the photoreactive group or the photoreactive derivative group has a higher absorbance than the reactive mesogen within a wavelength range of the irradiated light,
wherein the first polymer has a reactivity in response to being exposed to light within the light wavelength range for forming the alignment polymer that is greater than a reactivity of the reactive mesogen within the light wavelength range,
wherein the light wavelength range is about 250 nm to about 450 nm, and
wherein the number of protrusions disposed between the first alignment layer and the liquid crystal layer is larger than a number of protrusions disposed between the second alignment layer and the liquid crystal layer.

11. The method of manufacturing the liquid crystal display as claimed in claim 10, wherein:
the second alignment layer includes a second polymer, the second polymer including:
a second main chain and
a plurality of second side chains connected to the second main chain, at least one of the plurality of second side chains including a vertical alignment group.

12. The method of manufacturing the liquid crystal display as claimed in claim 10, wherein the photoreactive group includes a group represented by one of the following Chemical Formula 1 to Chemical Formula 12:

Chemical Formula 1

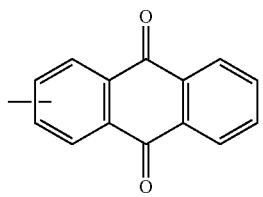

Chemical Formula 2

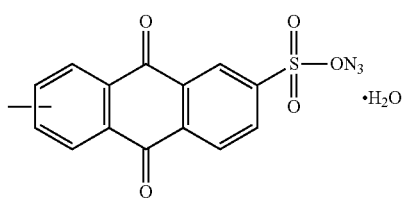

Chemical Formula 3

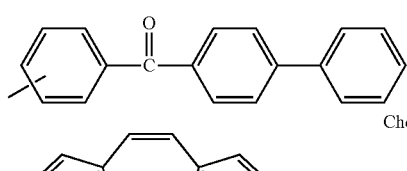

Chemical Formula 4

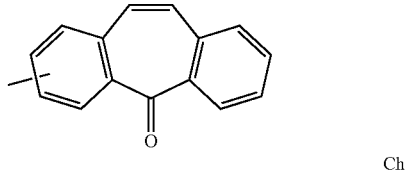

Chemical Formula 5

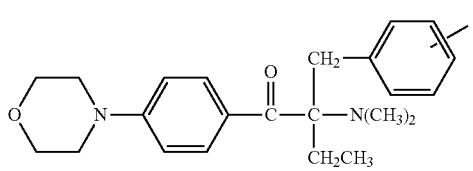

-continued

Chemical Formula 6

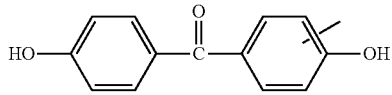

Chemical Formula 7

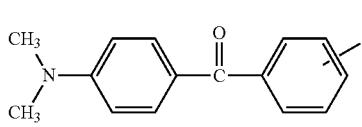

Chemical Formula 8

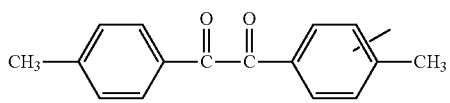

Chemical Formula 9

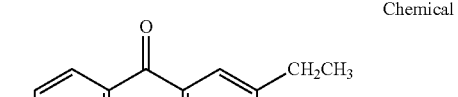

Chemical Formula 10

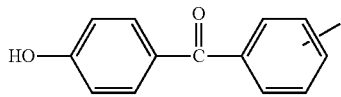

Chemical Formula 11

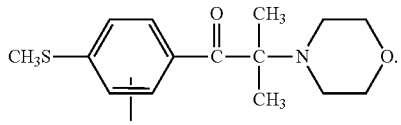

Chemical Formula 12

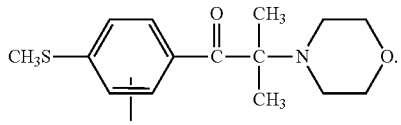

13. The method of manufacturing the liquid crystal display as claimed in claim 10, wherein the reactive mesogen includes a compound represented by the following Chemical Formula 13:

R1-S1-P1-E-P2-S2-R2    Chemical Formula 13 wherein, in Chemical Formula 13,

R1 and R2 each independently include one of acrylate and methacrylate,

S1 and S2 each independently include a substituted or non-substituted C1 to C4 alkylene group or a single bond, P1 and P2 each independently include a substituted or non-substituted

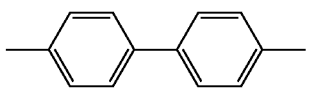

or a substituted or non-substituted

, and

E includes one of —O—, —S—, —CO—, —CO—O—, —OCO—, —O—CO—O—, —OCH$_2$—, —CH$_2$O—, —COO—, —O—CH$_2$—CH$_2$—O—, or a single bond.

14. The method of manufacturing the liquid crystal display as claimed in claim 13, wherein the reactive mesogen includes a compound represented by one of the following Chemical Formula 14 to Chemical Formula 21:

Chemical Formula 14

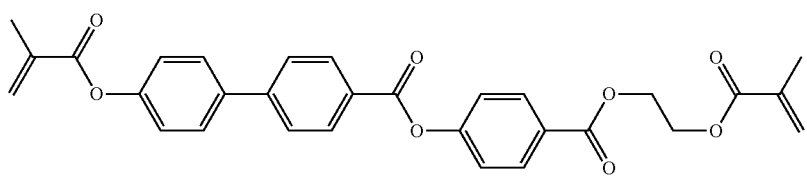

Chemical Formula 15

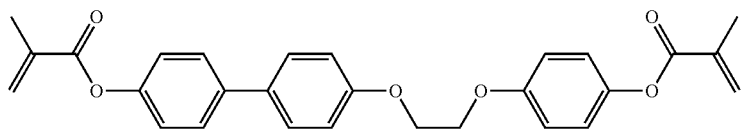

Chemical Formula 16

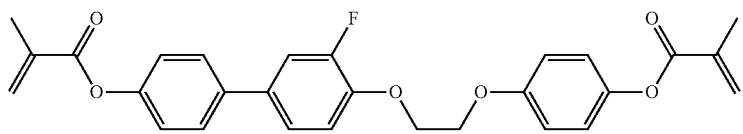

Chemical Formula 17

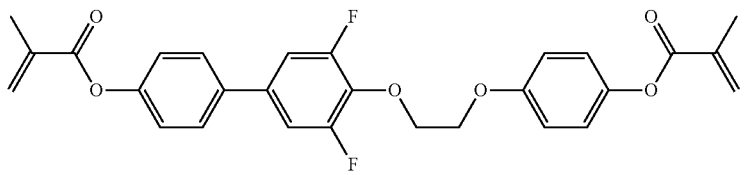

Chemical Formula 18

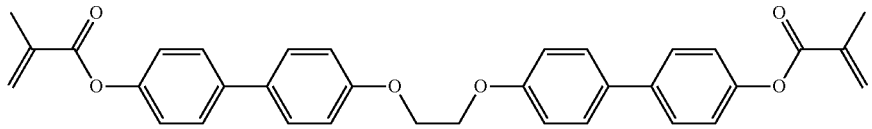

Chemical Formula 19

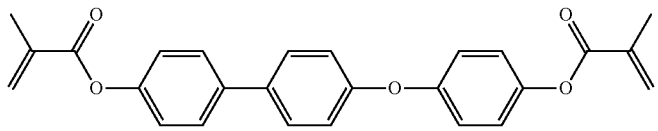

Chemical Formula 20

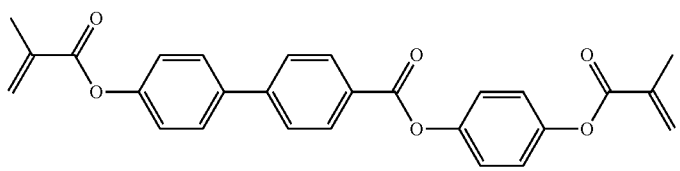

Chemical Formula 21

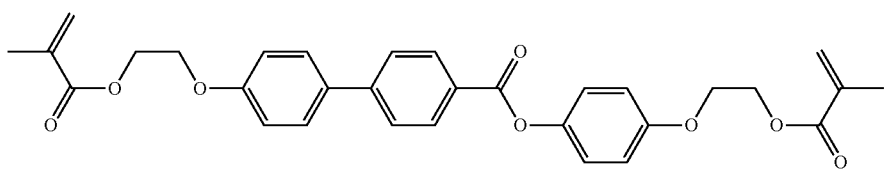

15. The method of manufacturing the liquid crystal display as claimed in claim 10, wherein a pre-tilt angle of a liquid crystal molecule that is adjacent to the first alignment layer is greater than a pre-tilt angle of a liquid crystal molecule that is adjacent to the second alignment layer.

16. The method of manufacturing the liquid crystal display as claimed in claim 10, wherein the liquid crystal display is a curved display.

17. A liquid crystal display, comprising:
a first substrate;
a second substrate overlapping the first substrate at a distance therefrom;
a liquid crystal layer between the first substrate and the second substrate, the liquid crystal layer including a plurality of liquid crystal molecules;
a first alignment layer between the first substrate and the liquid crystal layer, the first alignment layer including a first polymer; and
a second alignment layer between the second substrate and the liquid crystal layer, the second alignment layer including a second polymer, and
a plurality of protrusions between the first alignment layer and the liquid crystal layer, at least one of the plurality of protrusions including an alignment polymer polymerized from a reactive mesogen,
wherein:
the first polymer includes a first main chain and a plurality of first side chains connected to the first main chain, at least one of the plurality of first side chains including a photoreactive group or a photoreactive derivative group, the photoreactive group or the photoreactive derivative group has an absorbance that is greater than that of the reactive mesogen within a light wavelength range for forming the alignment polymer, the first polymer has a reactivity in response to being exposed to light within the light wavelength range for forming the alignment polymer that is greater than a reactivity of the reactive mesogen within the light wavelength range, the light wavelength range being about 250 nm to about 450 nm, the number of protrusions disposed between the first alignment layer and the liquid crystal layer is larger than a number of protrusions disposed between the second alignment layer and the liquid crystal layer, and the photoreactive group or the photoreactive derivative group includes a group represented by one of the following Chemical Formula B1 or Chemical Formula B2:

Chemical Formula B1

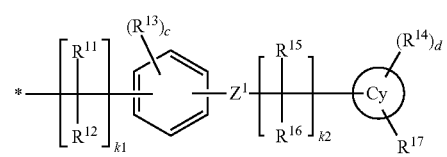

-continued

Chemical Formula B2

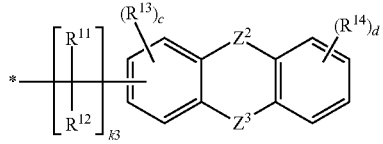

wherein, in Chemical Formula B1 and Chemical Formula B2,

Cy is a C6 to C18 aryl group or a C6 to C18 cycloalkyl group, $R^{11}$ to $R^{14}$ each independently include hydrogen or a substituted or unsubstituted C1 to C8 alkyl group, $R^{15}$ and $R^{16}$ each independently include a hydroxy group or a substituted or unsubstituted C1 to C8 alkoxy group, $R^{17}$ is hydrogen, a hydroxy group, or a substituted or unsubstituted C1 to C8 alkoxy group, c and d are each independently integers of 0 to 4, k1 and k3 are each independently integers of 3 to 20, k2 is an integer of 0 to 5, Z1 and Z2 are —C(=O)—, and Z3 is —S— or —C(=O)—.

18. The liquid crystal display as claimed in claim 17, wherein a pre-tilt angle of a liquid crystal molecule that is adjacent to the first alignment layer is greater than that of a liquid crystal molecule that is adjacent to the second alignment layer.

19. The liquid crystal display as claimed in claim 18, wherein the reactive mesogen includes a compound represented by the following Chemical Formula 13:

R1-S1-P1-E-P2-S2-R2    Chemical Formula 13 wherein, in Chemical Formula 13,

R1 and R2 each independently include an acrylate or a methacrylate,

S1 and S2 each independently include a substituted or non-substituted C1 to C4 alkylene group or a single bond, P1 and P2 each independently include a substituted or non-substituted

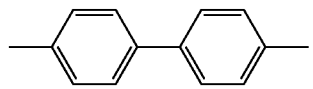

or a substituted or non-substituted

and

E includes —O—, —S—, —CO—, —CO—O—, —OCO—, —O—CO—O—, —OCH$_2$—, —CH$_2$O—, —COO—, —O—CH$_2$—CH$_2$—O—, or a single bond.

20. The liquid crystal display as claimed in claim 19, wherein the reactive mesogen includes a compound represented as given in Chemical Formula 14 to Chemical Formula 21:

Chemical Formula 14

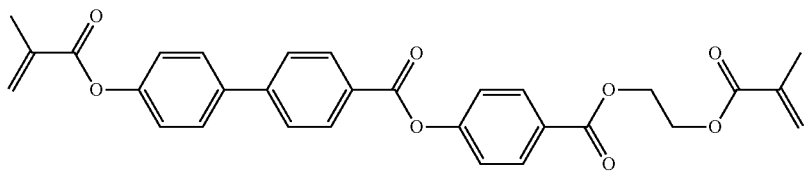

Chemical Formula 15

Chemical Formula 16

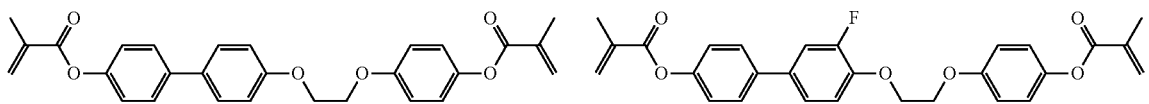

Chemical Formula 17

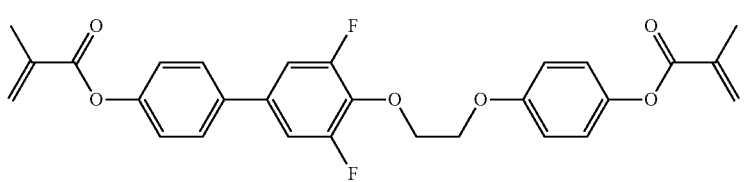

Chemical Formula 18

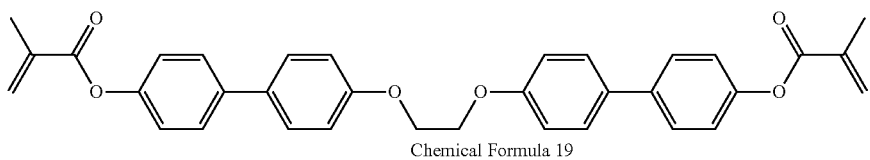

Chemical Formula 19

Chemical Formula 20

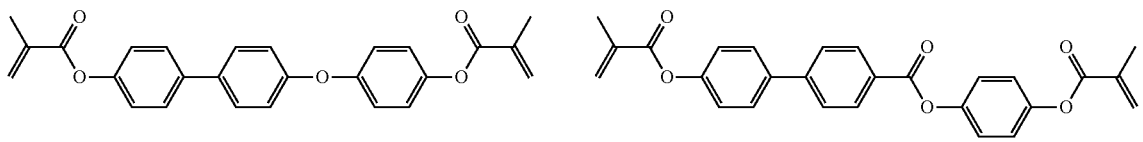

-continued
Chemical Formula 21
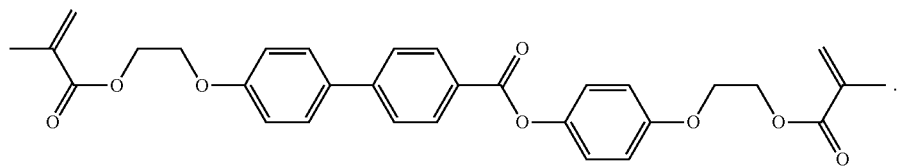
* * * * *